United States Patent [19]

Nakagawa et al.

[11] Patent Number: 5,072,689
[45] Date of Patent: Dec. 17, 1991

[54] CONTINUOUS HOT-DIP PLATING APPARATUS

[75] Inventors: Mitsuo Nakagawa, Mito; Hitoshi Okoshi, Hitachi; Osamu Shitamura; Hiroki Numata, both of Katsuta; Mituo Taguchi, Iwaki; Teruo Yamaguchi; Yasunobu Kani, both of Hitachi; Toshio Kamata, Katsuta; Takahiko Ookouchi, Katsuta; Junji Sakai, Ibaraki, all of Japan

[73] Assignee: Hitachi, Ltd., Tokyo, Japan

[21] Appl. No.: 365,547

[22] Filed: Jun. 13, 1989

[30] Foreign Application Priority Data

Jun. 15, 1988 [JP] Japan .................. 63-145754

[51] Int. Cl.$^5$ .............................. B05C 3/12
[52] U.S. Cl. .................... 118/419; 384/283; 384/902; 384/907.1; 501/97; 501/98
[58] Field of Search ........... 384/DIG. 901, 906, 907, 384/913, 273, 284, 285, 901, 913, 297, 902, 907.1, 283; 29/116.1, 123, 132, 148.4 D; 118/419, 74, 405, 420; 252/12; 501/97, 98

[56] References Cited

U.S. PATENT DOCUMENTS

| | | | |
|---|---|---|---|
| 1,663,444 | 3/1928 | Davis | 118/74 |
| 2,388,131 | 10/1945 | Fairley et al. | 118/74 |
| 3,595,207 | 7/1971 | Stricker | 118/420 |
| 3,711,171 | 1/1973 | Orkin et al. | 252/12 |
| 3,726,572 | 4/1973 | Beardmore | 384/913 |
| 3,938,868 | 2/1976 | Van Wyk | 384/913 |
| 4,410,285 | 10/1983 | Strasser et al. | 384/297 |
| 4,522,453 | 6/1985 | Lammer et al. | 384/907 |
| 4,664,595 | 5/1987 | Tsuji et al. | 384/907 |
| 4,735,862 | 4/1988 | Heinzl et al. | 384/907 |
| 4,806,080 | 2/1989 | Mizobuchi et al. | 384/907.1 |
| 4,808,014 | 2/1989 | Ueda et al. | 384/907.1 |
| 4,935,388 | 6/1990 | Lucek | 252/12 |

FOREIGN PATENT DOCUMENTS

| | | | |
|---|---|---|---|
| 1129796 | 5/1962 | Fed. Rep. of Germany . | |
| 2643958 | 3/1978 | Fed. Rep. of Germany . | |
| 55-34612 | 3/1980 | Japan . | |
| 59-47523 | 3/1984 | Japan . | |
| 60-35917 | 3/1985 | Japan . | |
| 60-205017 | 10/1985 | Japan . | |
| 60-208626 | 10/1985 | Japan . | |
| 60-196029 | 12/1985 | Japan . | |
| 61-92320 | 5/1986 | Japan . | |
| 0159813 | 7/1987 | Japan | 384/907.1 |
| 62-205254 | 9/1987 | Japan . | |
| 62-205255 | 9/1987 | Japan . | |
| 63-111318 | 5/1988 | Japan | 384/907.1 |
| 1024878 | 4/1966 | United Kingdom . | |

OTHER PUBLICATIONS

Fairley is cited as of interest.

Primary Examiner—Willard Hoag
Attorney, Agent, or Firm—Fay, Sharpe, Beall, Fagan, Minnich & McKee

[57] ABSTRACT

A continuous hot-dip plating apparatus has a roll assembly having superior resistance to erosion caused by the hot melt plating metal, as well as high resistance to wear of the shaft and bearings, which are immersed in the hot melt of the plating metal. A ceramic material is mounted on the sliding portions of the metallic roll shaft to make sliding contact with the metallic bearings and/or on the sliding surfaces of the metallic bearings which contact the metallic roll shaft. A clearance is left between the shafts and bearings to hold molten metal thereinbetween for lubrication.

25 Claims, 6 Drawing Sheets

CONTINUOUS HOT-DIP PLATING APPARATUS

BACKGROUND OF THE INVENTION

The present invention relates to a continuous hot-dip plating apparatus and, more particularly to a continuous hot-dip plating apparatus having a roll assembly which has superior resistance to erosion caused by molten metal and also to wear caused by friction between the roll shaft and bearings.

In general, a roll is supported by metallic bearings. This applies also to the case of a roll of a hot-dip plating (or coating) apparatus or a hot dipping apparatus which is used in plating molten metal. Therefore, the shaft of a plating roll of a hot- dip plating apparatus, as well as bearings in support of the shaft, are provided with a layer of a material having a high resistance to erosion, e.g., stainless steel, high-chromium steel and so forth, formed by pad welding or provided as a sleeve. Unfortunately, however, even such an erosion resistant material erodes after prolonged use as a result of contact with the molten metal or the friction between the roll shaft and the bearings, with the result that the clearance between the roll shaft and the bearings is undesirably increased. Generally, the clearance between the roll shaft and the bearings grow to an unacceptable level within four days when used continuously in a plating bath of molten aluminum and within seven days when used in a plating bath of molten zinc. In consequence, vibration is generated as a result of rotation of the roll shaft, with the result that a uniform plating on the steel strips cannot be achieved.

In order to avoid this inconvenience, it has been necessary to temporarily suspend the plating operation to allow renewal of the roll shaft and the bearings. Such suspension of operation is undesirable and impairs the production efficiency, increases the production of unacceptable products due to the stoppage of the plating line, consumes much money and labor for the renewal of the roll shaft and the bearings, and so forth, with the result that the production cost is undesirably raised.

In order to reduce erosion and wear, various proposals have been made in, for example, Japanese Utility Model Unexamined Publication Nos. 60-35917 and 60-196029, as well as in Japanese Patent Unexamined Publication Nos. 62-205254 and 62-205255. On the other hand, Japanese Patent Unexamined Publication (called Nos. 60-298626 and 61-92320 disclose the use of a ceramic material as the material of the sliding surface layer of the bearings in a continuous hot-dip plating apparatus, to make an effective use of the multiplied advantages of ceramics: namely, erosion resistance and wear resistance. Japanese Patent Unexamined Publication Nos. 60-298626 and 61-92320 also disclose the use of ceramics as the surface materials of the inner and outer races and roller elements of a roller bearing which is intended for use under severe conditions such as high-temperature and corrosive conditions. The roller bearings disclosed in these patent specifications, however, employ impractically large numbers of parts and have to meet strict requirements for dimensional precision of the parts, resulting in a raised production cost. The coating of the rolling surfaces of the parts is met with a problem in that the thickness of the coating layer is undesirably limited. It is also to be noted that wear in the amount of several microns to ten or more microns can easily occur even when using ceramics. Thus, a considerably frequent renewal is also required when the rolling parts are coated with ceramics. In addition, the above-mentioned two patent specifications fail to disclose in what manner the rolling parts are coated with ceramics, as well as the selection, dimensions and evaluation of ceramics. Thus, these specification do not show any process for forming a roll bearings having a ceramics layer.

SUMMARY OF THE INVENTION

In general, a roll shaft and supporting bearings of a continuous hot-dip plating apparatus, which are used in the plating bath of a molten metal, suffer from erosion caused by the molten metal, as well as heavy wear of the sliding surfaces due to loads applied to the sliding portions of the roll shaft and to the bearings as a result of a large tensile load on the steel strip which is to be plated. The erosion and/or wear of the sliding part undesirably increases the clearance between the roll shaft and the bearings, with the result that stable operation of the plating apparatus is impaired due to vibration caused by the rotation of the roll shaft.

Accordingly, it is a principal object of the present invention to provide a continuous hot-dip plating apparatus in which corrosion and wear resistances of the sliding parts of the roll or the roll shaft and the bearings which are used in a plating bath of a molten metal are improved to ensure a longer life of the roll and/or the bearings. The extended life of the roll and/or the bearings reduces the frequency of the renewal so that the yield or production efficiency is improved by virtue of the fact that the frequency of renewal of the worn parts and, hence, the period of suspension of the operation of the continuous hot-dip plating apparatus are reduced. In addition, the rate of generation of the unacceptable products attributable to frequent stopping of the plating line is reduced, whereby the cost incurred for the purpose of replacement of the roll is reduced to lower the production cost.

According to the invention, the above-described objects are achieved by providing a ceramic layer on the sliding portions of a metallic roll shaft which are held in sliding contact with the bearings and/or on the surfaces of which slidingly support the above-mentioned sliding portions of the roll shaft.

According to one aspect of the present invention, a continuous hot-dip plating apparatus having bearings held in a bath of a melt of a plating metal, and a roll rotatably supported in the bath by the bearings, wherein a clearance is provided between each of the bearings and the roll shaft. The size of the clearance enables the melt to come into the clearance during rotation of the roll. The invention also has a ceramic as a sliding member on at least a portion of the surface of the metallic bearing shell of the bearing.

According to the second aspect of the present invention, a continuous hot-dip plating apparatus having bearings held in a bath of a melt of a plating metal, and a metallic roll rotatably supported in the bath by the bearings has a clearance that exists between each of the bearings and the roll shaft. The size of the clearance enables the melt to come into the clearance during rotation of the roll. The invention also has a ceramic as a sliding member on at least a portion of the surface of the metallic bearing shell of the bearing, and a ceramic as a sliding material on each of the sliding surfaces of the roll supported by the bearing.

According to the third aspect of the present invention, a roll bearing in sliding contact with another member within a bath of a melt of a plating metal in a continuous hot-dip plating apparatus is made of ceramic and at least the sliding surface of the ceramic is left in an as-sintered state without being machined.

According to the fourth aspect of the present invention, a method of using a roll bearing for use in sliding contact with another member within a bath of a melt of a plating metal in a continuous hot-dip plating apparatus has the sliding portion of the bearing composed of a ceramic in the form of a sleeve or a plurality of rings. The ceramic is periodically moved in the rotational direction so as to allow adjustment of the sliding contact between the bearing and a roll shaft carried by the bearing, thereby preventing any uneven wear of the sliding portion of the bearing.

According to the fifth aspect of the present invention a roll assembly for use in a continuous hot-dip plating apparatus includes bearings held in a bath of melted plating metal, and a roll rotatably supported in the bath by the bearings, wherein at least one of each sliding surface of the roll shaft and the sliding surface of the associated bearing is made of a ceramics having a large wettability to the melt of the plating metal.

According to the sixth aspect of the present invention, a roll assembly for use in a continuous hot-dip plating apparatus, includes bearings held in a bath of a melt of a plating metal, and a roll rotatably supported in the bath by the bearings, wherein at least one of each sliding surface of the roll shaft and the sliding surface of the associated bearing is made of a porous ceramic having open pores formed thereon.

According to the seventh aspect of the present invention, a roll assembly for use in a continuous hot-dip plating apparatus includes bearings held in a bath of a melt of a plating metal, and a roll rotatably supported in the bath by the bearings, wherein at least one of each sliding surface of the roll shaft and the sliding surface of the associated bearing is made of a ceramic having minute holes formed thereon.

According to the eighth aspect of the present invention, a roll assembly for use in a continuous hot-dip plating apparatus includes bearings held in a bath of a melt of a plating metal, and a roll rotatably supported in the bath by the bearings, wherein at least one of each sliding surface of the roll shaft and the sliding surface of the associated bearing is made of ceramic having fine grooves formed thereon.

The bearing shell is in general made of an iron or steel material, preferably of a stainless steel or a chromium steel which has high resistance to erosion. The ceramic is mounted on a metallic bearing shell in the form of a sleeve. A ring or a plurality of shell-like segments on the circumferential portions suffers from heavy wear.

According to the invention, the roll may be made either from metal or from a ceramic. Wear of the roll shaft, however, requires the plating line to be stopped so that the roll shaft also is preferably made from a ceramic which is resistant to wear.

When the sliding parts are made of ceramic the present invention should exhibit superior resistance to wear in a molten metal bath, as well as resistance to wear at high temperatures. suitable materials are: oxide type ceramics such as $Al_2O_3$, $BeO$, $ZrO_2$, $MgO$, $CaO$, $Cr_2O_3$, $3Al_2O_3 \cdot 2SiO_2$, $MgO \cdot SiO_2$ 2 and $2MgO \cdot 2Al_2O_3 \cdot 5SiO_2$; carbide type ceramics such as $SiC$, $B_4C$, $TiC$, $WC$, $VC$ and $ZrC$; nitride type ceramics such as $Si_3N_4$, $AlN$, $TiN$ and $ZrN$; boride type ceramics such as $BN$, $ZrB_2$ and $TiB_2$; and later-mentioned composite ceramics represented by Sialon, $Si_3N_4$-BN, Sialon-BN, Sialon-SiC and so forth.

Each of the ceramics mentioned above exhibits superior resistance to erosion in a molten metal bath, as well as high resistance to wear when used under a condition where lubrication by the melt is available, as compared with iron containing metals. The lubrication by melt and, hence, wear resistance equivalent to that obtained under a lubricated condition, however, cannot be obtained with a random selection of these ceramics. Namely, various factors such as the strength, wear resistance, ease of production, purpose and conditions of use have to be considered in selecting the ceramic material. In regard to the ease of production, high formability and sinterability are essential for producing large-size ceramic sleeves.

The first viewpoint of the present invention is related to a common understanding that the rate of erosion of ceramics is closely related to the degree of wetting of the ceramics with metal melt, more specifically, the smaller the wettability, the greater the erosion resistance. For instance, wettability of $SiC$, $Al_2O_3$, $Si_3N_4$ and BN becomes smaller, i.e., wet contact angle becomes greater, in the mentioned order when these ceramics are used together with molten aluminum. From this point of view, it is considered that the use of $Si_3N_4$ or BN is preferred when continuous hot-dip plating is conducted with molten aluminum. According to the first viewpoint of the invention, it is preferred to use ceramics known as sialon, generally expressed by $Si_{6-z}Al_zO_zN_{8-z}$ ($Z \leq 4.2$), which exhibits small wettability to Al and Zn which are broadly used as plating metals.

The second viewpoint of the invention is related to the fact that the wear-resistance of a sliding member is significantly ruled by the friction coefficient of the sliding surfaces. Among various factors which affect the friction coefficient, the effect of lubrication is an important factor which should not be neglected. In general, the friction between sliding parts which are dipped in a metal melt is considered as being a melt lubrication friction. However, if both parts have small levels of wettability to the melt, friction between these parts is as large as that in a dry friction, thus causing heavy wear of these parts or part. From the second viewpoint, therefore, it is preferred that the ceramics used in the invention preferably have a certain level of wettability to the metal melt, though such the wettability tends to impair the erosion resistance to some extent. Needless to say, the wet contact angle between a metal melt and a ceramic varies depending on conditions such as the kind of the metal melt, plating condition and so forth. It is therefore advisable to select a suitable ceramic which has a small angle of contact.

From a synthetic point of view including both the first and second viewpoints, it is preferred that both sliding parts are made of ceramics which exhibit small wettability to the metal melt and that these parts are constructed to invite the metal melt into the gap between these parts and to hold the same in the gap, thereby realizing a melt-lubricated sliding condition. Such a construction can be obtained by using a porous ceramic material, or by forming a multiplicity of indentations, holes and/or grooves in the surface of the ceramic material by a post-machining, so that the metal melt can be held in the pores, indentations, holes and/or grooves.

Other objects, features and advantages of the present invention will become clear from the following description of the preferred embodiments when the same is read in conjunction with the accompanying drawings.

DESCRIPTION OF THE PREFERRED EMBODIMENTS

Figure 1:
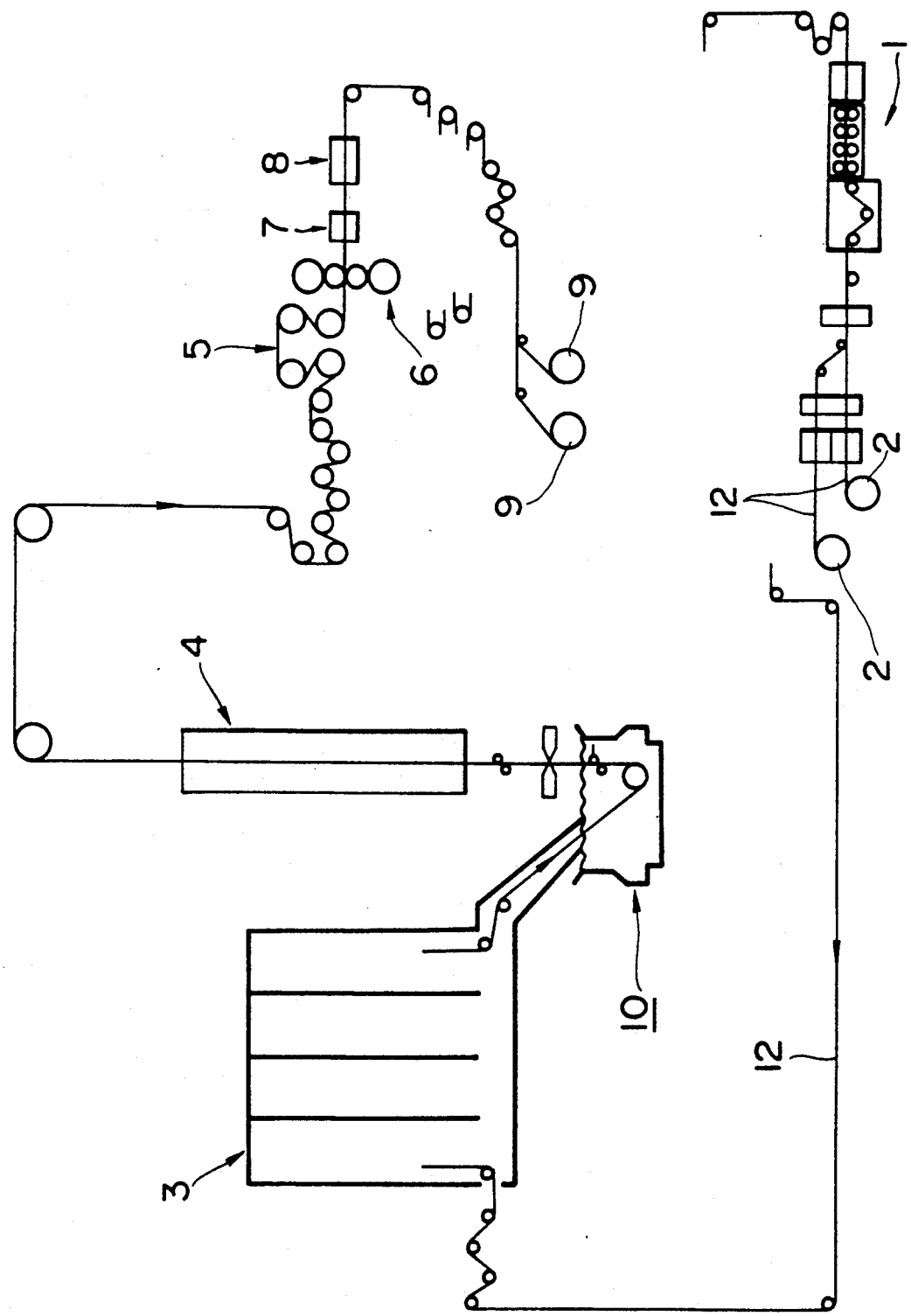
FIG. 1 is an illustration of a continuous hot-dip plating process employing a continuous hot-dip plating apparatus of the present invention.
Figure 2:
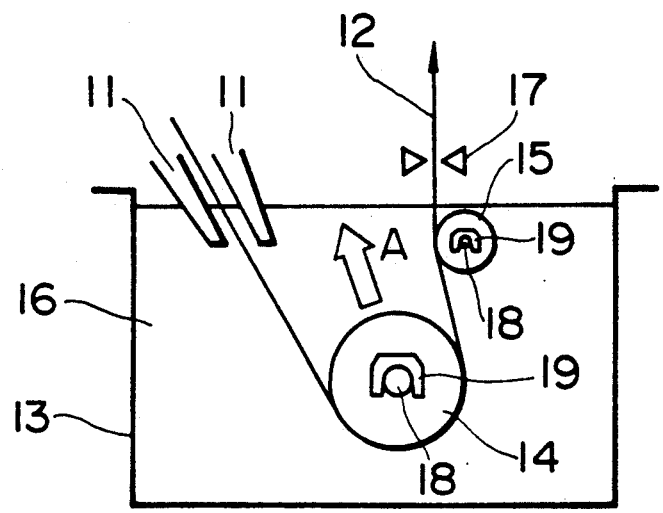
FIG. 2 is a sectional view of an essential portion of a continuous hot-dip plating apparatus of the present invention.

FIG. 1 illustrates a continuous hot-dip plating process including a continuous hot-dip plating apparatus 10. A steel strip 12 to be plated is continuously rinsed through an inlet rinsing zone 1 which is composed of a rinsing tank, a scraper and an electrolytic rinsing tank, and is taken-up by a pay-off reel 2 past a welder, a cutter and a leveler. The strip 12 paid-off from a pay-off reel 2 is sent to the hot-dip plating apparatus 10 through an annealing furnace 3. The strip 12 which is hot-dip-plated through the apparatus 10 is taken-up by a tension reel 9 through a surface adjusting device 4, a bridge roll device 5, an SPM 6, a tension leveler 7 and a formation processing device 8. The plating apparatus 10 is shown in FIG. 2 in a greater scale. The strip 12 which is fed through a snout 11 is turned around a sink roll 14 of a sink roll device in a plating bath contained in a plating tank 13 and is taken out of the tank 13. A support roll 15 of a support roll device serves to stabilize the running of the strip 12 which is running out of the plating bath after turning around the sink roll 14. The strip 12 taken out of the plating bath is made to pass through a wiping nozzle 17 which serves to regulate the plating thickness. Since the molten metal of the plating bath serves as a lubricant for lubricating the sliding portions between the shaft 18 of the support roll and the sink roll device and the associated roll bearing shells 19, slide-type bearings are most commonly used as the roll bearing shells 19.

A careful examination of the conventional sink roll bearing has proved that the wear of the roll bearing takes place and progresses in the direction of the vector of force which is generated as a result of the turning of the strip 12 around the sink roll 14 (see the arrow A in FIG. 2).

Figure 3:
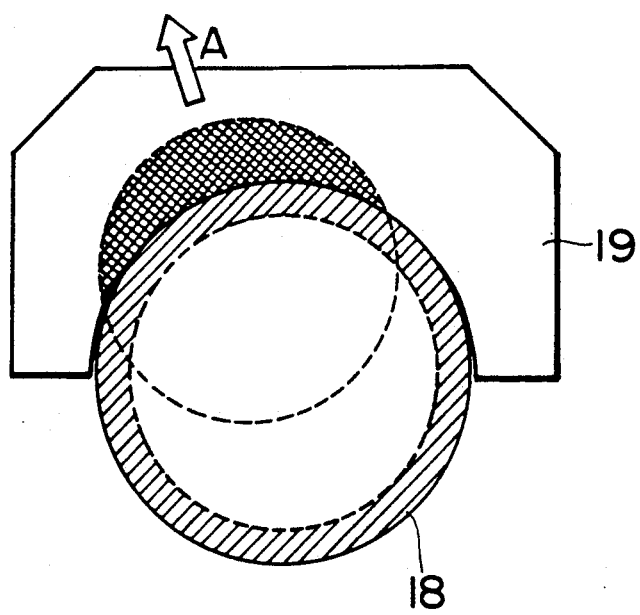
FIG. 3 is a diagrammatic illustration of a manner in which wear of a metallic sink roll bearing and wear of a metallic sink roll shaft proceed in the continuous hot-dip plating apparatus shown in FIG. 2.

In FIG. 3, the states of progress of the wear of the sink roll bearing shell 19 and the sink roll shaft 18 are illustrated by hatched areas.

Example of the invention worked out from the first viewpoint mentioned before, as well as the results of a test conducted with such an embodiment, will be described with specific reference to Examples 1 to 5.

EXAMPLE 1

The selection of the appropriate ceramic as the material of the sliding parts is one of the most important factors. Sliding wear characteristics exhibited by various materials in a molten metal bath were therefore examined through an experiment. The test was conducted by pressing test pieces of various materials to a side surface of a disk rotated in a metal melt. The test conditions were as follows.

| | |
|---|---|
| Size of rotary disk: | 100 mm diameter and 5 mm thick |
| Size of test pieces: | 30 mm long, 30 mm wide and 5 mm thick |
| Contact pressure: | 50 kg/cm$^2$ |
| Sliding speed: | 15 m/min |
| Kind of metal melt: | Aluminum |
| Test temperature: | 700° C. |

Figure 4:
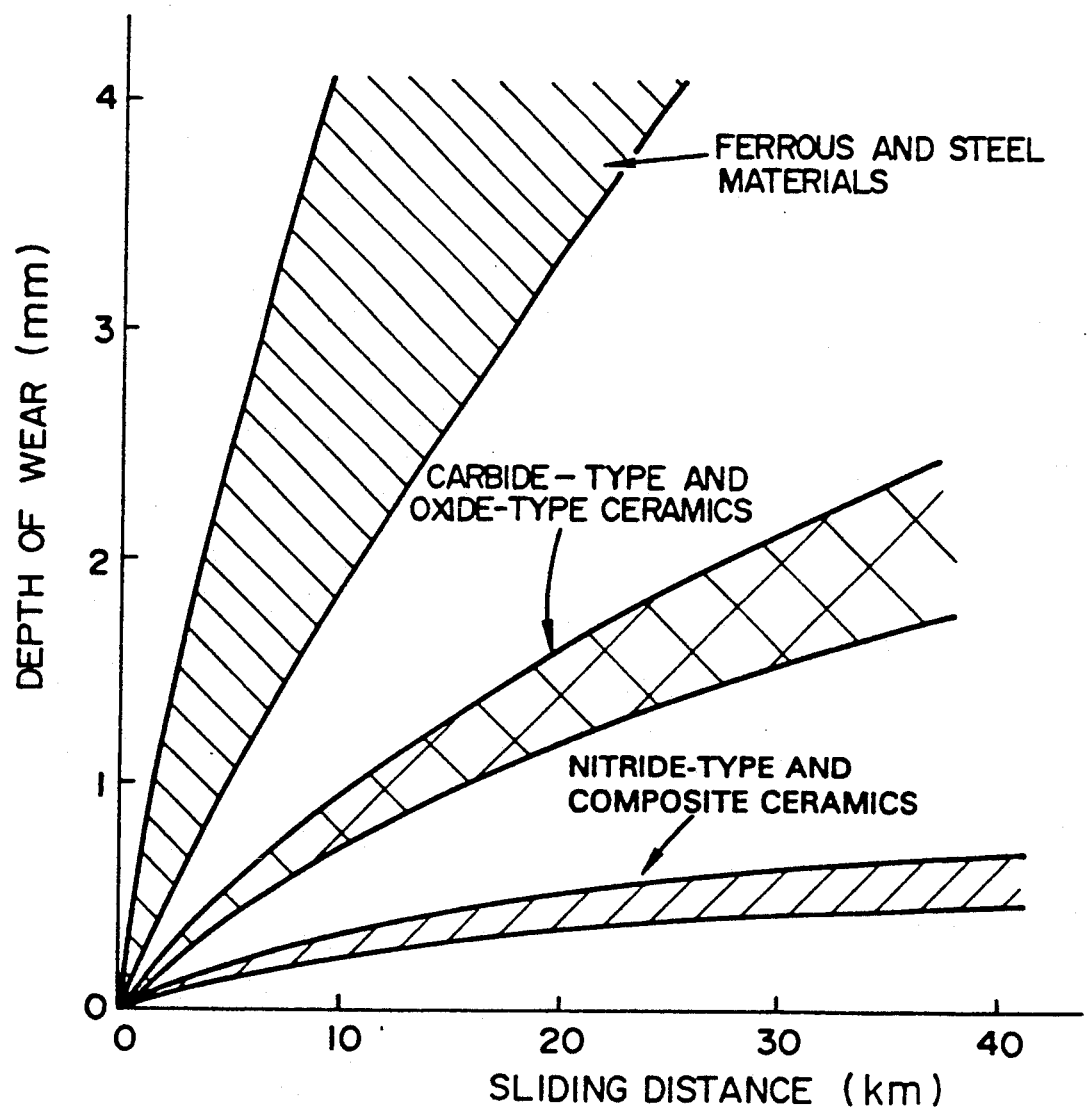
FIG. 4 is a chart illustrating the results of a slide friction test conducted with various materials.

A bearing steel JIS SUJ-2 was used as the material of the rotary disk. On the other hand, the test pieces were fabricated from the following materials: a material JIS FC-25 as an example of ferrous material, materials JIS S 50C, JIS SUJ-2 and JIS SUS 304 as examples of steel materials, a material SiC as an example of a carbide-type ceramic, $Al_2O_3$ and $ZrO_2$ as examples of oxide-type ceramics, and materials $Si_3N_4$, sialon $Si_3N_4$-BN and sialon-BN as examples of nitride-type ceramics and composite ceramics. FIG. 4 shows the results of the wear test. As will be seen from FIG. 4, the amount of wear increases as the sliding distance increases but the rate of growth of the wear varies according to the materials. Thus, the materials can be sorted into the following three types from the viewpoint of the relationship between the sliding distance and the depth of wear.

(i) Ferrous and steel materials (ii) Oxide and carbide ceramics (iii) Nitride composite nitride-based ceramics.

The metallic materials (i), which were conventionally used, were tested for the purpose of comparison with the ceramic materials. It will be seen that any of the ceramic materials tested showed superior wear resistance as compared with the conventionally used metallic materials. It will also be seen that the nitride ceramic materials and composite ceramic materials showed greater wear resistance than those exhibited by oxide and carbide ceramics. The ceramic materials of nitride and nitride-based composite ceramic materials are, for example, ceramics such as silicon nitride ($Si_3N_4$) and composite ceramic materials containing, as its major component, silicon nitride, e.g., sialon, $Si_3N_4$-BN and sialon-BN which is a material composed of 90 wt% of sialon and 10 wt% of BN.

EXAMPLE 2

A test was conducted by using a ceramic sleeve 20 (see FIG. 5) as a sliding member used in the present invention. The test was executed by mounting this ceramic sleeve 20 on the sliding surface of a bearing shell 19 of the sink roll device of the type shown in FIG. 2.

A ceramic material selected from the group of the nitride and composite ceramic materials which showed superior results as shown in FIG. 4, in particular, the sialon ceramics which showed superior formability and sinterability, were used as the material of the ceramic sleeve 20. More specifically, the sialon ceramics are expressed by $Si_{6-z}Al_zO_zN_{8-z}$, where Z can be varied within the range of 0 to 4.2 and which is generally referred to as $\beta$-sialon.

To explain in more detail, in this example, a powder of sialon of the above-mentioned formula (Z=0.5) was mixed with a small quantity of binder, and the mixture was wet-kneaded in methanol, and then granulated by a spray drying method. The granules were then compacted to a piece having an outside diameter of 250 mm, inside diameter of 170 mm and a length of 250 mm by a cold isostatic press. The thus formed piece was then subjected to provisional baking and was then machined by a lathe to a predetermined size which was determined by taking into account a dimensional change caused by the final baking, as well as the finishing margin. The final baking was conducted at 1750° C. Since the baking temperature approximates the thermal decomposition temperature of silicon nitride, the formed material tends to thermally decompose and become a metal silicon and blow holes tend to be formed in the sintered body as a result of the relief of the metal silicon. In order to avoid such a thermal decomposition, the final baking was executed in an atmosphere composed mainly of nitrogen gas.

Figure 5:
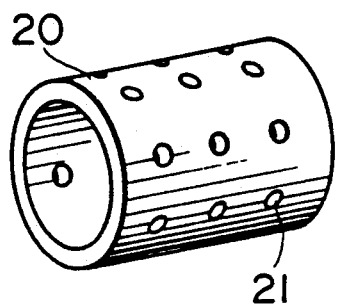
FIG. 5 is a perspective view of a ceramic sleeve incorporated in an embodiment of the present invention.

FIG. 5 shows the appearance of the sintered body 20 after finish machining. The finished sintered body or the ceramic sleeve had an outside diameter of 200 mm, an inside diameter of 150.6 mm and a length of 200 mm. The inner peripheral surface of the ceramic sleeve thus formed was not subjected to any machining and was tested in an state. Namely, the inner peripheral surface of the ceramic sleeve had circularity and cylindricity of 0.3 mm or less in terms of errors, as well as a surface state of 7S or finer, thus well meeting general requirements for bearing surfaces which are intended for use in a molten metal bath. In this Example, the finish machining was conducted such that the ceramic sleeve achieves an outside diameter and a length which well conform with those of the bearing shell 22. Such final machining, however, is not essential and the ceramic sleeve of this example may be used without any final processing. The ceramic sleeve was then subjected to machining for forming through-holes holes 21 from the outer to inner sides of the sleeve in eight rows which are equi-spaced in the circumferential direction, each row including three holes. Thus, 24 through-holes were formed in total. Each through-hole 21 is a non-threaded hole of 10 mm dia. and the opening thereof in the inner peripheral surface of the sleeve 20 was machined to a depth of 8 mm as measured from the sleeve inner surface at an angle of 45° to receive an oval counter-sunk head of a bolt.

Figure 6:
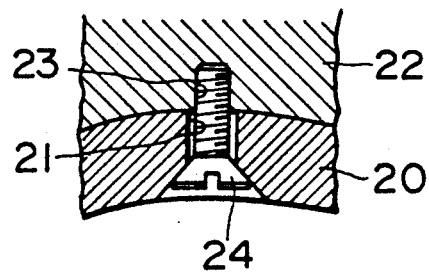
FIG. 6 is a sectional view showing an essential portion of the continuous hot-dip plating apparatus, illustrating particularly the manner in which the ceramic sleeve shown in FIG. 5 is mounted on a bearing shell.

FIG. 6 illustrates a manner in which ceramic sleeve 20 is mounted on a bearing shell 22 by means of bolts 24 screwed into a corresponding threaded hole 23 in the shell 22. Namely, the ceramic sleeve 20 was fixed to the bearing shell 22 by means of counter-sunk head bolts 24 each having an overall length of 30 mm, length of threaded portion of 20 mm, length of head of 6 mm and an outside diameter of threaded portion of 8 mm. The mounting work was executed at a normal temperature and a clearance of 1 mm in terms of radius was left between the wall of the through-hole and the bolt. A material JIS SUS 304 was used as the material of the bearing shell so that the difference in the thermal expansion coefficient between the ceramic sleeve and the bearing shell was about $9 \times 10^{-7}/°$ C. Thus, no excessive stress is caused by fastening with bolts when the temperature is raised to the level of the temperature for plating with aluminum or zinc.

Figure 7:
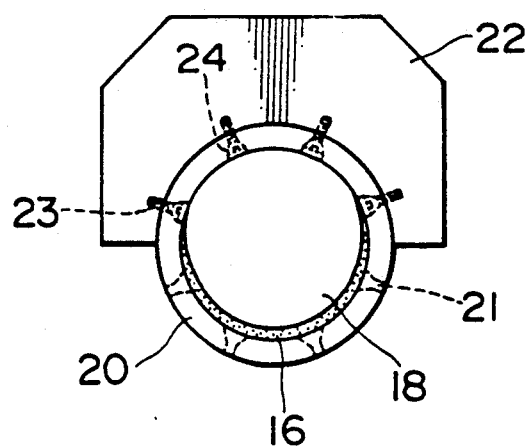
FIG. 7 is an illustration of the relationship between the ceramic sleeve fixed on the bearing shell and the roll in the state of use.

FIG. 7 schematically shows a roll shaft 18 of the invention for continuous hot dip plating in accordance with the present invention.

The ceramic sleeve was mounted on the bearing shell such that it extends in parallel with the roll axis, by making use of four out of eight rows of through-holes, i.e., 12 through-holes. The roll shaft 18 was processed such that a gap of 1 mm in terms of radius is left between the inner sliding surface of the ceramic sleeve 20 and the roll shaft 18. Thus, a clearance of 2 mm at the maximum exists between the roll shaft 18 and the roll bearing (including ceramic sleeve 20). In operation, the metal melt 16 of the plating bath is allowed to come into this clearance so as to perform lubrication. The roll shaft used in this test was made of a steel JIS SUJ-2.

A description will be given of the results of a test conducted to confirm the advantages of the present invention. A sink roll device having a roll bearing of the present invention was used in a continuous plating apparatus in molten aluminum of 680° C., together with a conventional roll bearing made of a steel. While the conventional steel roll bearing exhibited a wear of about 15 mm in four days, the roll bearing of this invention showed a wear on the order of about 0.6 mm which is as small as 1/25 that of the conventional roll bearing.

The roll bearing of the invention was used continuously for twelve days without replacement. The depth of wear was 1 mm or less, thus proving superior effect of the present invention.

In order to confirm another advantage of the present invention, the ceramic sleeve 20 after 12-day use was taken out of the roll bearing and was used again after a circumferential shift of the position in amount of ⅛ of the circumference. No abnormal wear was found in this case, and the amount of wear after 12-day use in this new position was not greater than 1 mm, as is the case of the wear at the initial position. It is thus possible to use the same ceramic sleeve 20 for eight times while avoiding any increase in the wear. If the inner surface of the ceramic sleeve is machined after repetition of use for eight times to recover the circularity and cylindricity of the sleeve, the sleeve can become usable again, thus allowing repeated use of ceramic sleeves which are expensive.

Although the ceramic member was used in the form of a sleeve, this is only illustrative and the ceramic member may be used in the form of a semi-circular or semi-cylindrical member, without substantially impairing the advantages of the present invention. In such a case, however, the ceramic member cannot be used repeatedly unlike the case of the cylindrical ceramic member. It is also possible to compose the ceramic sleeve from a plurality of coaxial ceramic rings.

EXAMPLE 3

In Example 2 described hereinbefore, the invention was applied to a sink roll device. In Example 3, the invention is applied to a support roll device which is used in a continuous hot-dip plating bath.

The material and the production process of the ceramics member are materially the same as those of Examples 1 and 2. A test was conducted by using a ceramic sleeve mounted on the support roll bearing and a segment-type ceramics member provided on the support roll shaft. The ceramic sleeve had an outside diameter of 120 mm, an inside diameter of 92 mm and a length of 100 mm. The ceramics member on the roll shaft in the form of segments had an outside diameter of 90 mm, an inside diameter of 70 mm, a length of 100 mm and a width of 25 mm. The test was executed in accordance with a routine work in a hot-dip plating bath of aluminum of 680° C. After a 12-day use of the test sample, the roll and the bearing were extracted for the purpose of measurement of wear in the sliding parts of the ceramics. The wear was measured to be 0.3 mm or less, thus proving the advantage of the present invention.

EXAMPLE 4

Figure 8:
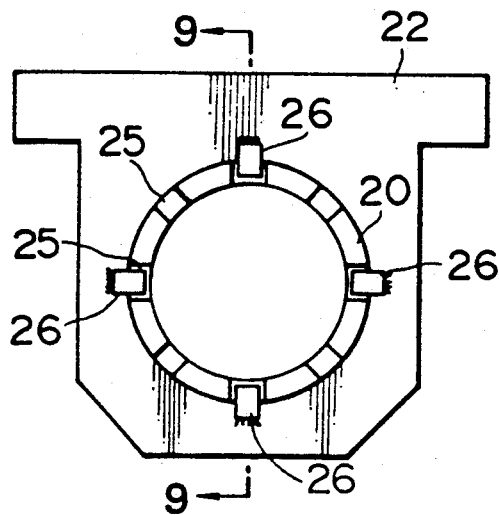
FIG. 8 is an illustration of another example of the manner in which the ceramic sleeve is mounted on a bearing shell.
Figure 9:
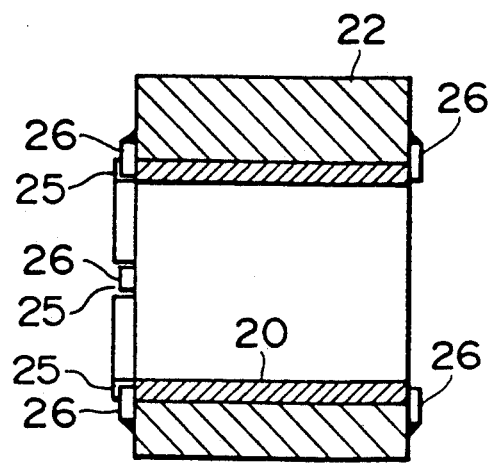
FIG. 9 is a sectional view taken along the line 9—9 of FIG. 8.

In Examples 2 and 3, the ceramic sleeve was fixed to the bearing shell by means of bolts. A test, however, was conducted by fixing the ceramic sleeve by other means other than bolts, as will be understood from the following description of Example 4. In this Example, a ceramic sleeve 20 was used which had an outside diameter of 200 mm, an inside diameter of 150.6 mm and a length of 210 mm. A plurality of notches or recesses 25, each having a depth of 10 mm and a width of 15 mm, were formed in one axial end surface of the ceramic sleeve 20 at a constant circumferential pitch or interval. As shown in FIG. 8, the bearing shell 22 had a central cavity for mounting the ceramic sleeve 20 therein. The diameter of the cavity of the bearing shell was 200.5 mm. Thus, a clearance was left between the ceramic sleeve 20 and the bearing shell 22 for easy mounting and demounting of the ceramic sleeve 20. Thus, the ceramic sleeve 20 could be used repeatedly by being rotated through a predetermined angle after use at each rotational position. Steel blocks 26 serving as retainer tabs, each being 13 mm wide, 8 mm high and 25 mm long, were welded at 90° interval to the axial end surface of the bearing shell 22 adjacent to the axial end of the ceramic sleeve 20 where the notches or recesses 25 were formed. The ceramic sleeve was then fitted in the central cavity of the bearing sleeve from the opposite side to the blocks 26. Since the blocks 26 are sized to loosely fit in the recesses 25, no excessive stress was caused even at the operation temperature. As shown in FIG. 9, the axial end of the ceramic sleeve 20 opposite to the recesses 25 was retained by a pair of blocks 26. This, however, is not exclusive and the sleeve may be retained by means of, for example, a ring plate or the like member. The test was conducted under the same conditions as Example 2, and the same results as Example 2 were confirmed, thus proving the advantages of the invention regardless of the difference in the method of mounting the ceramic sleeve.

EXAMPLE 5

Figure 10:
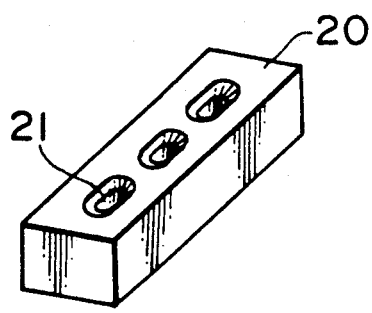
FIG. 10 is a perspective view of a bearing ceramic segment used in another embodiment of the present invention.
Figure 12:
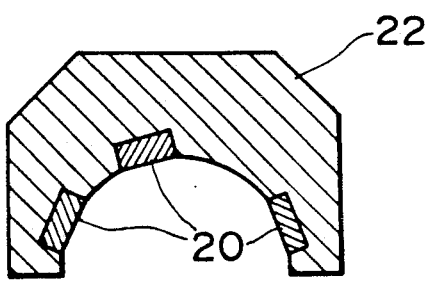
FIG. 12 is an illustration of a manner in which a plurality of ceramic segments are mounted on a bearing shell.

A plurality of ceramic segments 20 of the type shown in FIG. 10 were mounted on a bearing shell 22 in support of a sink roll device of FIG. 2, in a manner shown in FIG. 12. Sialon was used as the ceramic material in this case.

The composition of the sialon is expressed by $Si_{6-z}Al_zO_zN_{8-z}$, where Z is variable within the range of 0 to 4.2, and is generally referred to as $\beta$-sialon. More specifically, in this Example, a sialon powder of the above-mentioned formula ($Z=0.5$) was mixed with a small quantity of binder and the mixture was wet-kneaded in methanol followed by granulating by a spray-drying method. Subsequently, the granulated material was pressed by a cold isostatic press so as to be formed into a piece of 25 mm long, 62 mm wide and 250 mm long. The piece was then baked at 1750° C. for five hours. This baking temperature is close to the decomposition temperature of silicon nitride, so that the material tends to thermally decompose to become a metal silicon, leaving blow holes after the relief of the silicon. In order to avoid this undesirable effect, the baking was executed in an atmosphere mainly composed of a nitrogen gas.

FIG. 10 illustrates the appearance of the ceramic segment obtained after final machining. The ceramic segment thus obtained had a length of 20 mm, width of 50 mm and a length of 200 mm. Three through-holes 21 were formed in the sintered piece at an interval of 50 mm in the longitudinal direction of the ceramic segment. Each through-hole 21 was an oval non-threaded hole having a longer axis of 10 mm and a shorter axis of 8.5 mm. One end of each through-hole was machined to a depth of 8 mm and at a taper angle of 45° so as to form a recess capable of receiving the head of a counter-sunk head bolt.

Figure 11:
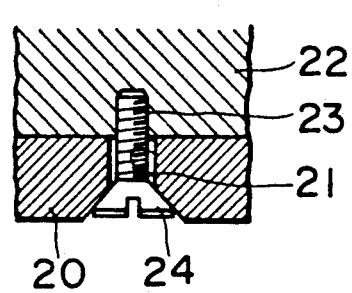
FIG. 11 is a sectional view of an essential portion of the embodiment illustrating the manner in which the ceramic segment of FIG. 10 is mounted on a bearing shell.

FIG. 11 illustrates a manner in which the ceramic segment 20 was secured to a bearing shell 22. As shown, the ceramic segment 20 was fastened to the bearing shell 22 by three bolts 24 which were driven into threaded bolt holes 23 formed in the bearing shell 22. The bolt 24 was a counter-sunk head bolt 24 having an overall length of 30 mm, length of threaded portion of 20 mm, length of head of 6 mm and a thread outside diameter of 8 mm. The operation for fixing the ceramic segment 20 to the bearing shell 22 was conducted at room temperature. A clearance of 1 mm was left between the wall of each non-threaded hole 21 in the ceramic segment and the bolt 24 as measured in the direction of the longitudinal axis of the through-hole 21. An austenitic stainless steel JIS SUS 304 was used as the material of the bearing shell. Thus, the difference in the thermal expansion coefficient between the bearing shell and the ceramic segment was $9 \times 10^{-7}/°$ C. When the interval or spacing of the bolts is 50 mm as in the illustrated example, the thermal displacement caused when the segment is heated to plating temperature suitable for plating with aluminum or zinc is about 30 μm at the greatest. It is therefore possible to prevent generation of excessive stress though the ceramic segment which was fixed with bolts.

FIG. 12 shows a state in which the ceramic segments 20 were fixed to the bearing shell 22. Namely, a piece of ceramic segment 20 was fixed to a portion of the bearing shell 22 which is offset from the neutral or vertical axis of the bearing shell 22 by an angle of 18°, using bolts which use recesses and bolt holes which have been beforehand formed in the bearing shell 22. In addition, a pair of ceramic segments 20 were secured to both wing portions of the bearing shell at positions about 20 mm apart from the lower ends of wings of the bearing shell 22. These three pieces of ceramic segments 20 were arranged such that the inner surfaces of these three segments define a circle of a diameter of 150 mm. The roll shaft was made of a high carbon chromium bearing steel JIS SUJ-2 and the diameter of the roll was 148 mm.

A test was conducted in order to confirm the effects of the present invention. A continuous hot-dip plating was conducted by using a sink roll supported by bearings of this Example, within a molten aluminum plating bath of 680° C. It was confirmed that, while a conventional steel roll bearing showed a wear depth of about 15 mm after operation for four days, the roll bearing of this Example showed a wear of about 1 mm which is as small as about 1/15 that of the conventional steel bearing. The bearings of this Example were then subjected to a continuous 12-day operation while the roll was changed every four days. The depth of wear of the bearings after the 12-day use was as small as about 1.5 mm, thus proving a remarkable improvement in the life of the roll bearings.

Embodiments of the invention based on the aforementioned first and second viewpoints of the invention will be described hereinafter through illustration of Examples 6 to 11.

EXAMPLE 6

The most critical factor of the invention is to select an appropriate ceramic material. The inventors therefore measured, in an argon gas atmosphere, the "wet contact angle" of various ceramic materials with a molten Zn plating bath of 700° C. and a molten Al plating bath of 1000° C. The ceramic materials tested were alumina ($al_2O_3$), zirconia ($ZrO_2$), beryllia (BeO), boron nitride (BN), silicon carbide (SiC), silicon nitride ($Si_3N_4$) and sialon ($Si_{5.5}Al_{0.5}O_{0.5}N_{7.5}$). A test was also conducted in which test pieces of these ceramic materials were dipped for 5 hours in each of the molten Zn plating bath of 700° C. and the molten Al plating bath of 1000° C. and the depths of erosion of the test pieces were measured. Each of the ceramic materials showed a wet contact angle approximating 180° with respect to the molten Zn of 700° C. This means that the tested ceramic materials are materially not wettable with molten Zn of 700° C. In addition, the depths of erosion of these ceramic materials after the 5-hour dipping in the molten Zn of 700° C. were generally as small as 2 μm or less. The small wettability of these ceramic materials with respect to molten Zn means that no substantial liquid lubrication effect can be expected when these ceramic materials are used in a molten Zn plating bath.

Figure 13:
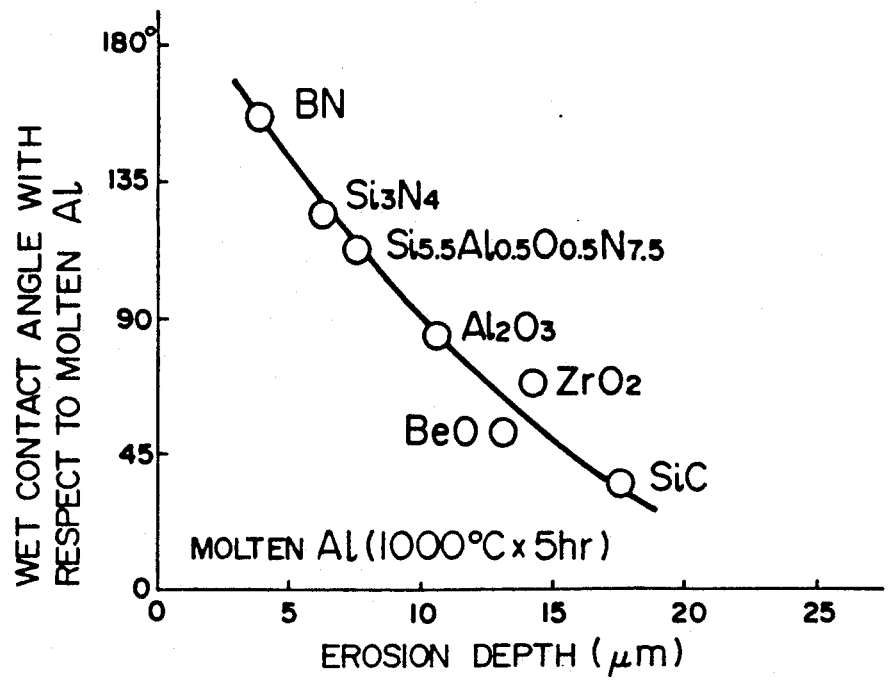
FIG. 13 is a graph showing the results of a test showing the wettability of various ceramic materials to molten Al.

Referring now to the molten Al bath of 1000° C., BN showed the greatest wet contact angle (158°) among the tested ceramic materials, while the smallest wet contact angle (34°) was exhibited by SiC. Thus, the wet contact angle largely varies depending on the kind of the ceramic. In general, the ceramic materials which exhibit greater wet contact angle showed smaller erosion depth and conversely, the ceramic materials having smaller wet contact angle showed greater erosion depth. FIG. 13 shows the relationships between the erosion depth (abscissa) and the wet contact angle with respect to molten Al (ordinate) as observed with the tested ceramic materials. It will be seen that the erosion depth-wet contact angle characteristics of these ceramic materials are plotted almost on or around a single curvilinear line. From FIG. 13, it will be seen that BN, $Si_3N_4$ and $Si_{5.5}Al_{0.5}O_{0.5}N_{7.5}$ exhibit wet contact angles considerably greater than 90°, as well as small erosion depths, thus proving small wettability of these ceramic material to molten Al. On the other hand, oxide-type ceramic materials, i.e., $Al_2O_3$, $ZrO_2$ and BeO, and carbide-type ceramic material, i.e., SiC, showed wet contact angles smaller than 90°, as well as large erosion depths, thus proving that these ceramic materials have large wettability to molten Al. From the first and second viewpoint of the invention mentioned before, it is therefore understood that the object of the present invention can be achieved by using an oxide-type or a carbide-type ceramic materials.

The wettability of the ceramic material also is affected by factors such as the surface roughness, impurity content and density of the ceramic materials, as well as by the previously described factors such as the type and temperature of the molten metal.

EXAMPLE 7

An experiment was conducted to examine sliding friction wear resistance characteristics of ceramic materials in a molten metal. The test was carried out by pressing test pieces of various ceramic materials onto a side surface of a disk rotated at high speed in molten Al. The test conditions were as follows:

| | |
|---|---|
| Size of rotary disk: | diameter 100 mm, thickness 5 mm |
| Size of test piece: | 30 mm long, 30 mm wide and 5 mm thick |
| Contact pressure: | 10 kg/cm$^2$ |
| Sliding speed: | 100 m/min |
| Test time: | 5 hours |
| Test temperature: | 1,000° C. |

Figure 14:
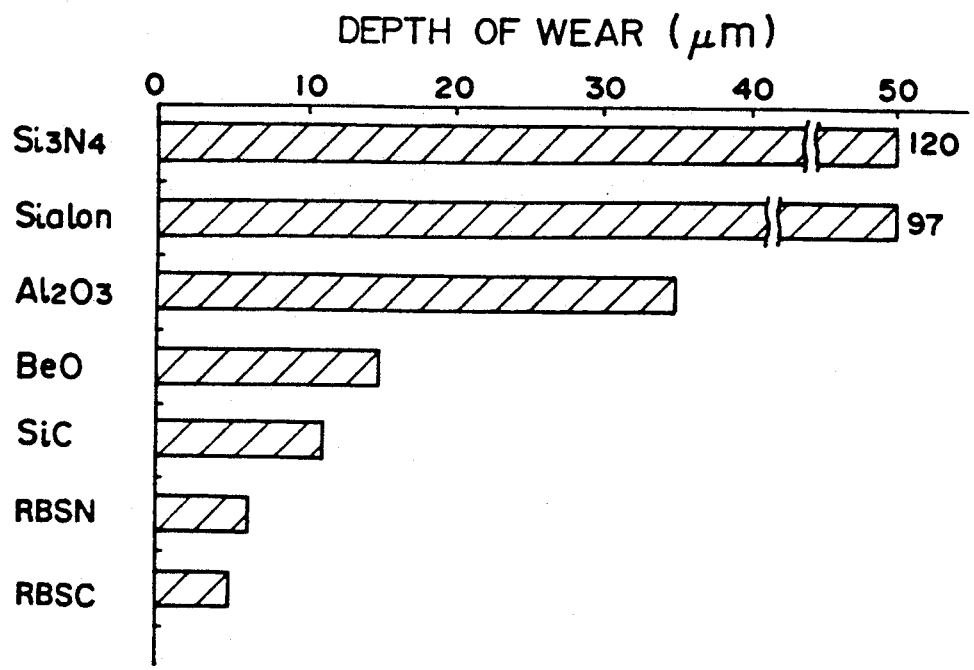
FIG. 14 is a graph showing the results of a sliding friction wear test conducted with various ceramic materials.

As the material of the rotary disk, $Si_3N_4$ which has a large contact angle was used. The ceramic materials tested were $Si_3N_4$, Sialon, $Al_2O_3$, BeO, reaction bonded $Si_3N_4$(RBSN) and a reaction bonded SiC(RBSC). The results of the test are shown in FIG. 14. From this Figure, it will be seen that a heavy wear takes place when both of the materials kept in sliding frictional contact have small wettability as is the case of the $Si_3N_4$ and Sialon, despite the use of the ceramic materials. Ceramic materials exhibiting wet contact angles smaller than 90°, e.g., $Al_2O_3$, can be liquid-lubricated by the molten metal so that the wear is reduced. A further reduction in the wear is attainable with BeO and SiC. Namely, BeO and SiC exhibit wear which is smaller than half that exhibited by $Al_2O_3$. In particular, RBSN and RBSC have open pores which can be impregnated with molten Al so that they can be well lubricated with molten Al when used in the molten Al bath, thus showing a remarkable reduction in the wear.

EXAMPLE 8

Figure 15:
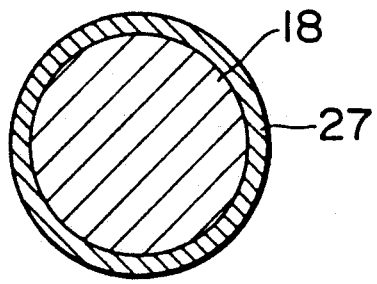
FIG. 15 is a sectional view of a roll shaft having a sleeve mounted on portions thereof which make sliding contact with bearings.
Figure 16:
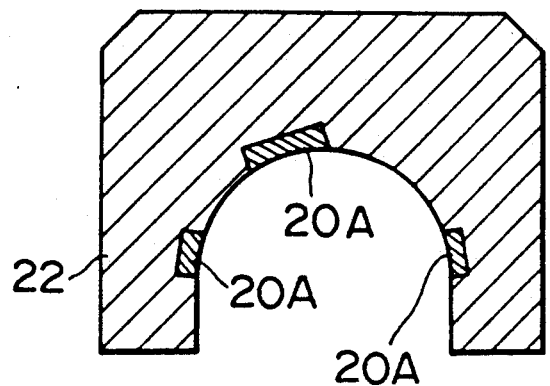
FIG. 16 is a sectional view of a bearing shell having ceramic segments on portions thereof which slidingly support a roll.

A ceramic sleeve 27 prepared in accordance with the present invention was fitted to each sliding portion of a sink roll shaft 18, as shown in FIG. 15. Also, ceramic segments 20A prepared in accordance with the invention were fitted in the sliding surface of bearing shells 22, as shown in FIG. 16. The sink roll shaft 18 with the ceramic sleeve 27 and the bearing shell 22 with the ceramic segments 20A were assembled together and were tested for the purpose of confirmation of the advantages of the present invention. The sink roll 14 used in this test had a barrel diameter of 422 mm, barrel length of 1160 mm, journal diameter of 130 mm and a journal length of 180 mm. An Ni-Cr-Mo steel tempered to exhibit a Brinell hardness of 320 was used as the material of the sink roll 14.

Sialon was used as the material of the ceramic sleeve 27 of FIG. 15. The sialon is expressed by $Si_{6-z}Al_zO_zN_{8-z}$, where Z is variable within the range of 0 to 4.2. This type of Sialon is generally known as β-sialon. More specifically, in this Example, powder of Sialon expressed by the above-mentioned formula, where Z being selected to be 0.5, was mixed with a small amount of binder, and the mixture was wet-kneaded in methanol. The kneaded mixture was then granulated by a spray drying method. The granulated material was then formed by a cold isostatic press at a pressure of 1,500 kg/cm². The thus formed material was then provisionally baked and machined by a lathe to a predetermined size taking into account a dimensional change which will take place during the final baking, as well as a finish machining margin. The final baking was conducted at 1750° C in a nitrogen gas atmosphere. The ceramic sleeve thus finished had an outside diameter of 150 mm, an inside diameter of 130.6 mm and a length of 180 mm.

The ceramic sleeve 27 was then mounted on the roll shaft 18 by a loose fit. The dimensional relationship was carefully selected such that the ceramic sleeve 27 would make a tight fit on the roll shaft without any risk of cracking when the roll shaft and the sleeve are heated to 650° C., since the test was executed by operating the roll continuously in a molten Al plating bath of 650° C.

On the other hand, the bearing as shown in FIG. 16 was prepared in the following manner. BeO was used as the material of the ceramic segment 20A. Three pieces of the ceramic segments 20A, each being 180 mm long, 50 mm wide and 20 mm thick, were mounted on the bearing shell 22 as shown in FIG. 16. More specifically, one piece of the ceramic segments 20A was fitted in a recess formed in a portion of the inner surface of the bearing shell which is in the direction of the vector of the force produced by the strip 12 which turns around the sink roll 14. After the mounting of these pieces of ceramics segments 20A, the sliding surface of the bearing shell was ground by a diamond abrasive tool of a grading of 5000 or so, such that the sliding surface of the bearing has a radius of curvature which is about 0.5 mm greater than that of the ceramic sleeve on the roll shaft.

The combination of the sink roll shaft and the bearing thus prepared was tested by being subjected to a continuous plating operation in an Al plating bath of 650° C, together with a combination of a conventional roll shaft and a conventional bearing. While the conventional arrangement could stand only a very short use of four days, the combination of the roll shaft and bearings prepared in accordance with the invention could stand continuous 1-month operation without suffering from any abnormal wear, thus enabling the plating layer to be formed uniformly and continuously.

EXAMPLE 9

In Example 9, RBSN was used in place of BeO which was used in Example 8. The RBSN was prepared by adding a small amount of a binder to an Si powder of a mean particle size of 0.8 μm, wet-kneading the mixture in a methanol, and granulating the kneaded mixture by a spray drying method. The material was then pressed into a piece by a cold isostatic press at a pressure of 1,500 kg/cm² and thus formed piece was temporarily baked in a nitrogen gas atmosphere and machined to a predetermined size. Since RBSN does not exhibit any substantial dimensional change during the final baking, the machining was executed to obtain a near-net shape which is almost the same in shape and size as the final product except the provision of a finishing margin. The final baking was executed at 1380° C. in a nitrogen gas atmosphere. The thus formed sintered member was then shaped by grinding into the form of the ceramic segment of 180 mm long, 50 mm wide and 20 mm thick, having an arcuate sliding surface. Thus formed ceramics segment had pores of 50 to 100 μm at a porosity of about 17%. Thus formed porous segment was then dipped in a molten Al bath of 650° C. and a reduced pressure of 10 Torr was applied thereto, so that the segment was impregnated with Al. The porosity is a factor which significantly affects the lubrication performance. In order to attain an appreciable lubrication effect, the porosity is preferably 5% or greater. On the other hand, a too large porosity causes a reduction in the mechanical strength. The present inventors have confirmed through an experiment that the porosity should not exceed 30% when the porous sinter ceramics segment is used on the roll bearing of the type to which the invention pertains. The porosity of the test pieces of the ceramic segment therefore was adjusted to be not smaller than 5% but not greater than 30%. Thus prepared ceramic segments were mounted on the bearing shell in the same manner as that in Example 8.

The combination of the sink roll shaft and bearings obtained through the described process was subjected to a continuous plating in an Al plating bath of 650° C., together with a combination of a conventional sink roll shaft and bearings. While the combination of the conventional sink roll shaft and bearings become unusable after 4 days of continuous operation due to wear of the roll shaft and the bearings, the combination of the sink roll shaft and the bearing prepared in accordance with the method of the present invention could withstand 2-months of continuous operation without suffering from any extraordinary wear, thus enabling the plating to be conducted uniformly and continuously.

EXAMPLE 10

In Example 10, Sialon was used in place of RBSN having open holes used in Example 9. More specifically, in Example 10, minute holes having a hole size of 150 μm and a depth of 1000 μm were formed at a spacing of 500 μm in the sliding surface, by laser machining. The sliding surface was then ground by a diamond abrasive wheel of a grading of 5000 or so in an amount of 10 μm of diameter. Then, the segment was dipped in an molten Al both of 650° C. and a reduced pressure of about 10 Torr was applied thereto so as to impregnate the segment with molten Al. Experiments were conducted to seek optimum values of the hole size, hole depth and the spacing of minute holes, as well as the ratio of the area occupied by the minute holes, since these factors significantly affect wear resistance and mechanical strength. It was confirmed through the experiment that impregnation with Al cannot be effected satisfactorily when the hole size is 20 μm or smaller and that a hole size exceeding 500 μm is not preferred because such a large hole size tends to allow breakage of the segment under the testing condition. It was also confirmed that holes which are too size cannot retain the molten metal very effectively. Namely, it was found that the hole depth should be equal to half the hole diameter, i.e., the hole radius, at the smallest. It was also found that if the spacing or pitch of the minute holes were too small a breakage of the ceramics segment would occur because of interference of stresses generated in the material around adjacent minute holes. It was confirmed that the pitch of the minute holes should be at least 2.5 times as great as the hole diameter. As to the ratio of the area occupied by the minute holes, it was confirmed that the same requirement as that for the open minute holes also applies to this case.

Pieces of ceramic segments thus prepared were mounted on the bearing in the same manner as that in Example 9.

The sink roll shaft and bearings of this Example were used in an Al plating bath of 650° C. of a continuous plating operation. The combination of the sink roll shaft and bearings of this Example could be used for a period which was more than 15 times longer than that exhibited by the conventional roll shaft and bearing.

EXAMPLE 11

In Example 11, fine grooves of a very small width were formed in the ceramic segment, in place of the fine pores used in Example 10, and electrically conductive composite-type ceramics, obtained by mixing 40% of titanium nitride in Sialon, were used as the material of the ceramic segment. Using a discharge electrode, minute grooves were formed spirally in the sliding surface of the ceramic segment at a width of 150 μm, depth of 800 μm and a pitch, i.e., distance between centers of adjacent grooves, of 500 μm. The sliding surface was then ground about 10 μm in terms of diameter, with a diamond abrasive tool of grading of 5000 or so.

Pieces of the segment were then impregnated with Al and mounted on the bearing shell in the same manner as Example 10. This Example was subjected to a test conducted under the same condition as Example 10, for the purpose of evaluation of the effect of the fine grooves, and an effect equivalent to that produced by the pores in the preceding Examples was confirmed. It was also confirmed that the longest life of the bearing is obtained when the grooves are formed with a width of 20 to 500 μm, depth which is at least half the width, pitch of at least 2.5 times as great as the width, and a ratio of area occupied by the grooves of 5 to 30%.

It is also to be noted that the pores in Example 10 can be formed by an electric spark machining, without impairing the effect. Similarly, an effect equivalent to that produced by Example 11 can be obtained when the fine grooves are formed by a laser machining rather than by the electric spark machining.

In Examples described hereinbefore, the ceramic members as sliding members can be used in various forms such as a sleeve, a plurality of pieces of segments, and a plurality of rings formed by slicing a sleeve. It is also possible to use a plurality of pieces of segments which are arranged in the axial direction of the roll, although in the illustrated Examples the pieces of segments are spaced in the circumferential direction.

Furthermore, an advantageous effect of lubrication in a molten metal bath can be also achieved by impregnating a ceramics member with solid lubricants such as carbon or molybdenum disulfide. Especially carbon is effective and preferable, since it can be co-fired with ceramics.

As has been described, according to the present invention, a structure or a roll assembly for use in a molten metal bath is proposed in which ceramics are used as the material of the sliding portions of a metallic roll shaft and/or the sliding surfaces of a metallic bearing in support of the roll shaft.

The ceramics used as the material of these sliding parts of the roll shaft and/or the bearings improve the erosion and wear resistance of these sliding parts, thus improving the durability of the roll shaft and/or bearings, so that the total cost of production of plated steel strips is lowered advantageously. The advantage offered by the present invention is remarkable particularly when a ceramic material having a comparatively large wettability to the molten metal is used as the material of the sliding portions of the roll shaft and/or the bearing.

What is claimed is:

1. A bearing system for a hot-dip plating apparatus, comprising:
   a predetermined quantity of a molten plating metal;
   a pair of bearing shells immersed in the molten plating metal having ceramic tubular bearing sleeves, each having an interior diameter;
   a roll immersed in the molten plating metal having opposite ends, each end of the roll having a shaft with a diameter smaller than the interior diameter of the sleeves, each of the shafts being rotatably supported by one of said sleeves, such that there is a gap between each said shaft and a respective sleeve for admitting the molten metal during operation of the apparatus to lubricate the bearing system; and
   said bearing sleeves being sectional ceramic sleeves secured to backing members by through bolts.

2. A bearing system according to claim 1, wherein each of said sleeves is formed of a sintered ceramic and has a sliding surface that is left in an as-sintered state without being machined.

3. A bearing system according to claim 1, wherein a sliding surface of each said ceramic sleeve has fine holes formed therein.

4. A bearing system according to claim 1, wherein a sliding surface of each said ceramic sleeve has fine grooves formed therein.

5. A bearing system according to claim 1, wherein an exterior sliding surface of each said shaft is comprised of a ceramic material.

6. A bearing system according to claim 5, wherein a material of each said sleeve has a wet contact angle to said molten metal that is not greater than 90°.

7. A bearing system according to claim 1, wherein each said bearing sleeve has means for mounting said sleeve to a respective said shell in a selectable plurality of different concentric orientations with respect to one another such that a different portion of said sleeve is subject to wear in each of said orientations.

8. A bearing system according to claim 1, wherein said ceramic sleeve comprises a boride type ceramic.

9. A bearing system according to claim 1, wherein each said ceramic sleeve comprises a composite ceramic, wherein said ceramic composite comprises at least one of $Si_{6-Z}Al_ZO_ZN_{8-Z}$, where Z is less than or equal to 4.2.

10. A continuous hot-dip plating apparatus, including a predetermined quantity of molten plating metal in which a metal strip is immersed for plating with said molten plating metal, comprising:
   a metallic roll having a pair of shafts, one at each end of said metallic roll; and
   first and second bearing means, each having a bearing surface, for rotatably guiding said shafts, respectively;
   wherein each said bearing surface has a radius of curvature sufficiently larger than that of its respective shaft so that a clearance formed between each said bearing and its associated shaft is lubricated by molten plating metal during said hot-dip plating; and
   wherein said first and second bearing means are sectional ceramic sleeve bearings secured to backing members by through bolts.

11. A continuous hot-dip plating apparatus as claimed in claim 10, wherein each bearing includes a bearing shell having a ceramic sleeve mounted thereto, and each said bearing surface comprises said ceramic sleeve.

12. A continuous hot-dip plating apparatus according to claim 11, wherein said ceramic sleeve has a wall provided with a plurality of bolt-receiving through-holes arranged at predetermined intervals both in the axial and circumferential directions, and is fixed to said bearing shell by means of a plurality of bolts driven through said through-holes.

13. A continuous hot-dip plating apparatus according to claim 12, wherein said through-holes are sized and shaped such that predetermined clearance is formed between the wall of each through-hole and the associated bolt, so as to prevent generation of excessive thermal stress attributable to a difference in the thermal expansion coefficient between the material of said bearing shell and the material of said sleeve.

14. A continuous hot-dip plating apparatus as claimed in claim 11, wherein each said bearing includes a plurality of retaining tabs, and wherein each said ceramic sleeve includes first and second ends, at least one ceramic sleeve having a plurality of recesses for engaging the retaining tabs of its associated bearing for retaining said bearing shell to said bearing.

15. A continuous hot-dip plating apparatus according to claim 14, wherein said recesses and said retaining tabs are sized and shaped such that said retaining tabs are loosely received in the associated recess so as to prevent generation of excessive stresses in one of the axial and circumferential directions due to a difference in the thermal expansion coefficient between the material of said bearing shell and the material of said ceramic sleeve.

16. A continuous hot-dip plating apparatus as claimed in claim 10, wherein at least a portion of each said bearing surface comprises a ceramic material.

17. A continuous hot-dip plating apparatus as claimed in claim 16, wherein said ceramic material comprises SiN.

18. A continuous hot-dip plating apparatus as claimed in claim 17, wherein said ceramic material is SiN.

19. A continuous hot-dip plating apparatus as claimed in claim 10, wherein each said bearing comprises a bearing shell and a plurality of bearing segments mounted to said bearing shell.

20. A continuous hot-dip plating apparatus as claimed in claim 19, wherein said metallic roll is a sink roll, and said apparatus further comprises at least one support roll immersed in said molten plate metal, wherein said metal strip causes said sink roll to exert a force at a point on the bearing shell during said hot-dip plating, and wherein one of said bearing segments is mounted to the bearing shell at the point of reception of the force.

21. A continuous hot-dip plating apparatus according to claim 20, wherein each of said segments has at least one bolt-receiving through-hole and is fixed to said bearing shell by means of a bolt driven through said bolt hole.

22. A continuous hot-dip plating apparatus according to claim 21, wherein said through-hole formed in said segment is shaped and sized such that a predetermined clearance is left between the wall of said through-hole and said bolt so as to prevent generation of excessive stress in one of the axial and circumferential directions due to a difference in the thermal expansion coefficient between the material of said bearing shell and the material of said ceramic sleeve.

23. A continuous hot-dip plating apparatus as claimed in claim 10, wherein the bearing surface of each said bearing comprises a plurality of ceramic bearing surface segments.

24. A continuous hot-dip plating apparatus as claimed in claim 23, wherein each said bearing surface is arranged as a portion of a circular circumference.

25. In a continuous hot-dip metal plating apparatus including a roll member for assisting the transport of a metal strip to be plated, and a bearing having a surface against which the metal strip causes the roll member to exert a force during the transport of the metal strip, said roll member and said bearing being immersed in a predetermined quantity of molten plating metal during the hot-dip plating process, the improvement comprising:
   said bearing having a radius of curvature that is larger than that of the roll member, wherein the bearing is made of a ceramic material, and at least the surface of the bearing against which the roll member exerts a force is in an as-sintered state without being machined; and
   said bearing being a sectional ceramic sleeve bearing secured to a backing member by at least one through bolt.

* * * * *

UNITED STATES PATENT AND TRADEMARK OFFICE
CERTIFICATE OF CORRECTION

PATENT NO. : 5,072,689
DATED : December 17, 1991
INVENTOR(S) : Nakagawa, et al.

It is certified that error appears in the above-indentified patent and that said Letters Patent is hereby corrected as shown below:

COLUMN 16:
    Claim 1, line 29, delete "a predetermined quantity of"; after "a", insert --tank for containing a--.
COLUMN 17:
    Claim 10, line 7, delete "predetermined quantity of" and insert --tank for containing a--;
            line 10, delete "metallic";
            line 11, delete "metallic roll".
COLUMN 18:
    Claim 20, line 14, delete "metallic";
            line 16, change "plate" to --plating--.

Claim 25, line 43, after "a", insert --tank for containing a molten plating metal,--;
            line 47, delete "a pre-";
            line 48, delete "determined quantity of" and insert -- the--;
            line 51, after "of", insert --a shaft of--;
            line 52, delete ", and at least the surface";
            line 53, delete in its entirety;
            line 54, delete in its entirety;
            line 55, delete "chined".

Signed and Sealed this

Seventh Day of September, 1993

Attest:

BRUCE LEHMAN

*Attesting Officer*          *Commissioner of Patents and Trademarks*